United States Patent
Wright et al.

(10) Patent No.: US 11,641,281 B2
(45) Date of Patent: May 2, 2023

(54) HASHING VALUES USING SALTS AND PEPPERS

(71) Applicant: HEWLETT PACKARD ENTERPRISE DEVELOPMENT LP, Houston, TX (US)

(72) Inventors: Joseph Wright, Houston, TX (US); Chris Davenport, Houston, TX (US); Andrew Cartes, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 321 days.

(21) Appl. No.: 16/861,285

(22) Filed: Apr. 29, 2020

(65) Prior Publication Data

US 2021/0344497 A1    Nov. 4, 2021

(51) Int. Cl.
*H04L 9/32*    (2006.01)
*H04L 9/08*    (2006.01)
*G06F 9/4401*    (2018.01)

(52) U.S. Cl.
CPC .......... *H04L 9/3236* (2013.01); *G06F 9/4416* (2013.01); *H04L 9/0869* (2013.01); *H04L 9/0877* (2013.01); *H04L 9/0894* (2013.01); *H04L 2209/12* (2013.01)

(58) Field of Classification Search
CPC ........ G06F 9/4416; G06F 21/31; G06F 21/34; H04L 9/0869; H04L 9/0877; H04L 9/0894; H04L 9/3236; H04L 2209/12
See application file for complete search history.

(56) References Cited

U.S. PATENT DOCUMENTS

| | | | |
|---|---|---|---|
| 7,200,758 B2* | 4/2007 | Zimmer ................ | G06F 21/575 713/192 |
| 9,154,304 B1* | 10/2015 | Dotan ................... | H04L 9/3228 |
| 9,455,977 B1* | 9/2016 | Bailey ...................... | H04L 9/32 |
| 9,881,147 B1* | 1/2018 | Windell .................. | G06F 21/46 |
| 11,321,448 B1* | 5/2022 | Sanchez ............... | H04L 9/0643 |
| 2005/0166263 A1* | 7/2005 | Nanopoulos ........ | H04L 63/0838 726/19 |

(Continued)

FOREIGN PATENT DOCUMENTS

| | | |
|---|---|---|
| CN | 110071793 A | 7/2019 |
| WO | WO-2018009564 A1 | 1/2018 |

OTHER PUBLICATIONS

A. Sguigna, "Securing Jtag-based At-scale Debug," Blog, Jun. 18, 2017, pp. 1-3, Retrieved from the Internet on Feb. 26, 2020 at URL: </blog.asset-intertech.com/test_data_out/2017/06/securing-jtag-based-at-scale-debug.html>.

(Continued)

*Primary Examiner* — Eric W Shepperd
(74) *Attorney, Agent, or Firm* — Trop, Pruner & Hu, P.C.

(57) ABSTRACT

In some examples, a management controller includes a communication interface to communicate with a computing device, where the management controller is separate from a processor of the computing device. The management controller includes a management processor to receive, from the computing device, a first hash value that is based on a first hash function applied on an input value and a salt, generate a second hash value based on applying a second hash function on the first hash value and a pepper, and send the second hash value to the computing device.

8 Claims, 5 Drawing Sheets

(56) References Cited

U.S. PATENT DOCUMENTS

| | | | |
|---|---|---|---|
| 2008/0183712 A1* | 7/2008 | Westerinen | G06F 21/6218 |
| | | | 707/999.009 |
| 2013/0096961 A1* | 4/2013 | Owens | G06Q 10/02 |
| | | | 705/5 |
| 2017/0228237 A1* | 8/2017 | Ponnusamy | G06F 9/4416 |
| 2017/0244692 A1* | 8/2017 | Bhupathiraju | H04L 63/083 |
| 2017/0346797 A1* | 11/2017 | Yedidi | H04L 63/14 |
| 2018/0013565 A1* | 1/2018 | Fox | H04L 9/0643 |
| 2018/0041499 A1* | 2/2018 | Rathineswaran | G06F 21/46 |
| 2020/0228322 A1* | 7/2020 | Bridges | G06F 21/6245 |
| 2021/0056208 A1* | 2/2021 | Gore | G06F 21/572 |

OTHER PUBLICATIONS

Krawczyk et al., Network Working Group, Request for Comments: 2104, Category: Informational, HMAC: Keyed-Hashing for Message Authentication, Feb. 1997 (11 pages).
Nordpass, Learning password security jargon: Password Peppering, Oct. 17, 2019 (4 pages).
Wikipedia, bcrypt last edited Mar. 21, 2020 (6 pages).

* cited by examiner

HASHING VALUES USING SALTS AND PEPPERS

BACKGROUND

Access to a computing device may be controlled based on user credentials. The computing device may not allow a user to access the computing device unless the user provides a valid user credential, which can be in the form of a username and password, a security token, or any other type of credential. If an attacker (e.g., malware, a human hacker, or another unauthorized entity) is able to derive the user credential, then the attacker may be able to gain unauthorized access of the computing device.

BRIEF DESCRIPTION OF THE DRAWINGS

Some implementations of the present disclosure are described with respect to the following figures.

Figure 1:
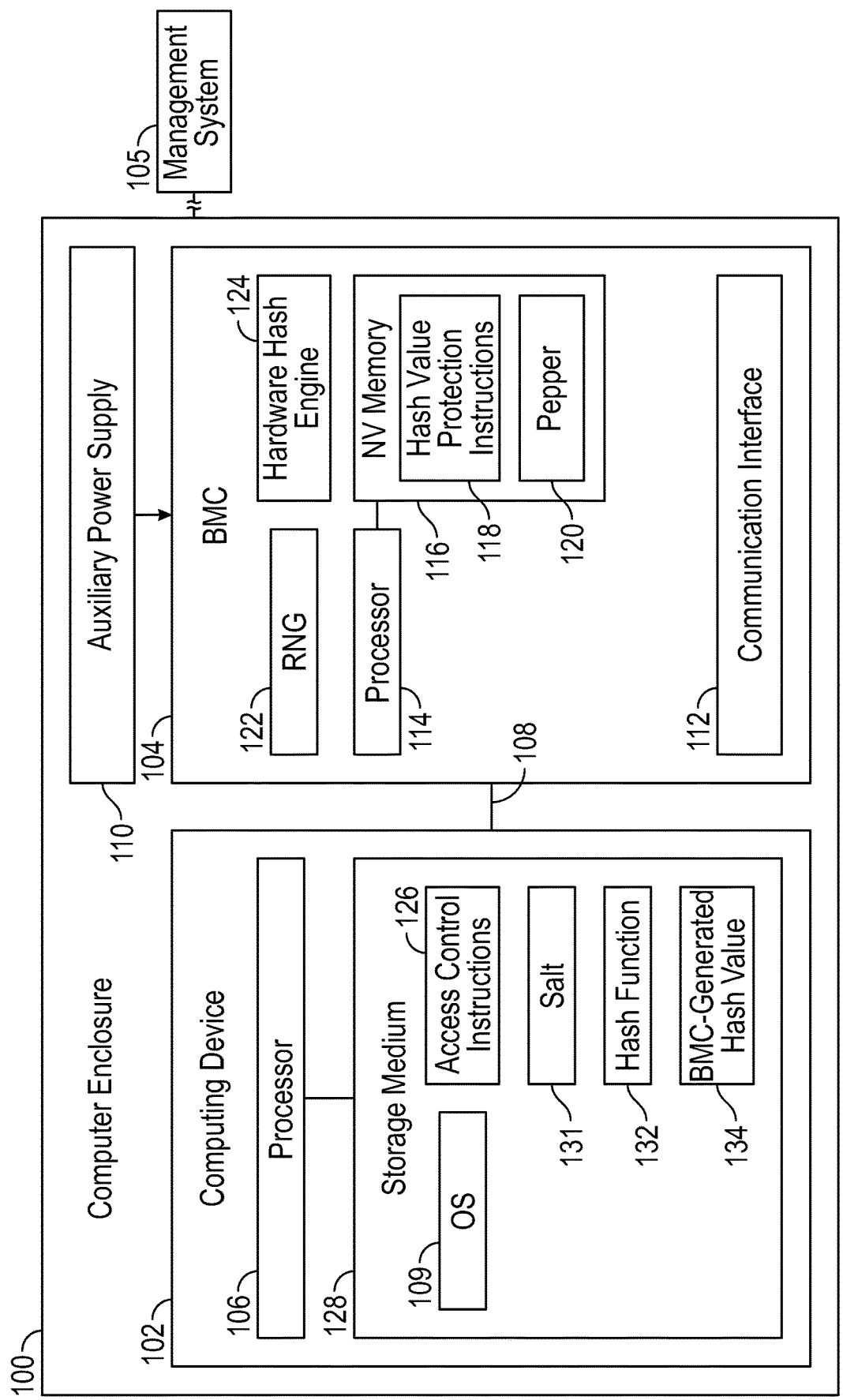
FIG. 1 is a block diagram of a computer enclosure according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a computing device can store or have access to a database that stores information associated with users who have permission to access the computing device. Providing a "user" a permission to access a computing device can refer to allowing the user to perform any or some combination of the following: access information stored in the computing device, access a physical resource (e.g., a processor resource, a storage resource, a communication resource, etc.) of the computing device, access a program (including machine-readable instructions) in the computing device, access information external of the computing device that is made accessible through the computing device, access a physical resource external of the computing device that is accessible through the computing device, or access a program external of the computing device that is accessible through the computing device.

The information stored in the database associated with user access of a computing device can be based on user credentials associated with respective users. A "user credential" can refer to any information associated with a user that permits the user to access a computing device upon the user submitting the user credential to the computing device.

To prevent unauthorized access of user credentials, rather than store the user credentials in the clear in the computing device, the computing device can use a database that stores information that is based on the user credentials. For example, a cryptographic hash function can be applied to a user credential to produce a hash value. The hash values for respective user credentials can be stored in the database, and the hash values are retrieved from the database to determine whether users are permitted to access the computing device upon the users presenting respective user credentials.

To make it more difficult for an attacker (malware, a human hacker, or another unauthorized entity) to derive user credentials based on the hash values stored by the computing device, a salt can also be used to strengthen the randomness of the hash values produced by a cryptographic hash function applied on user credentials. More specifically, a user credential and the salt can be provided as inputs to a cryptographic hash function, which produces a hash value based on a combination of the user credential and the salt. A "salt" can refer to a value that is used as an additional input to a function (e.g., a cryptographic hash function) to provide additional protection for another value (e.g., a user credential). In some examples, the salt can be in the form of a random number generated by a random number generator (e.g., a pseudo-random number generator or a real random number generator). A salt of a longer length provides more protection against unauthorized derivation of user credentials based on hash values.

The salt is maintained in the same database or in the same computing device that stores or has access to the database of hash values. As a result, even if a salt were added to strengthen the randomness of hash values produced by a cryptographic hash function, the fact that the salt is also available at the computing device can compromise the security of the user credentials, since an attacker can potentially access the salt in addition to the hash values in an attempt to work backwards to derive the user credentials.

In accordance with some implementations of the present disclosure, a management controller that is separate from a processor of a computing device can be used for enhancing the security of hash values used for verifying access to the computing device.

FIG. 1 is a block diagram of a computer enclosure 100 that includes a computing device 102 and a baseboard management controller (BMC) 104. The BMC 104 is an example of a management controller that is separate from a processor 106 of the computing device 102. A processor can include a microprocessor, a core of a multi-core microprocessor, a microcontroller, a programmable integrated circuit, a programmable gate array, or another hardware processing circuit.

The BMC 104 is able to apply a cryptographic hash function on a hash value produced at the computing device 102 and communicated to the BMC 104 over a secure connection 108 between the computing device 102 and the BMC 104.

A "secure connection" can refer to any communication medium, whether physical or logical, that protects the BMC 104 from unauthorized access by an attacker. For example, the BMC 104 may reside on a communication channel (e.g., a bus, a network, etc.) that is not accessible by programs that may run in the computing device 102, such as application programs or an operating system (OS). In other examples, communications over the secure connection 108 can be protected, such as by an encryption mechanism where information exchanged between the BMC 104 and the computing device 102 is encrypted.

In some examples, a "computing device" can include any or some combination of the following: a server computer, a desktop computer, a notebook computer, a tablet computer, a smart phone, a communication node (e.g., a switch, a router, etc.), a storage server, a vehicle or a controller of the vehicle, and so forth.

Although FIG. 1 shows the computer enclosure 100 including just one computing device 102, in other examples, the computer enclosure 100 can include multiple computing devices. In such examples, the computer enclosure 100 can be in the form of a rack that holds a number of computing devices. The BMC 104 (or alternatively, multiple BMCs) can communicate with the multiple computing devices in the computer enclosure 100.

As used herein, a "BMC" is a specialized service controller that monitors the physical state of a computing device (such as 102) using sensors and communicates with a management system 105 (that is remote from the computer enclosure 100, for example) through an independent "out-of-band" connection. The BMC 104 may also communicate with applications executing at an OS level through an input/output controller (IOCTL) interface driver, a Representational state transfer (REST) application program interface (API), or some other system software proxy that facilitates communication between the BMC 104 and application programs. The BMC 104 may have hardware level access to hardware components located in the computing device. The BMC 104 may be able to directly modify the hardware components (such as settings or configurations of the hardware components). The BMC 104 may operate independently of an OS 109 of the computing device 102. The BMC 104 may be located on the motherboard or main circuit board of the computing device 102 to be monitored by the BMC 104. The fact that the BMC 104 is mounted on a motherboard of the managed computing device 102 or otherwise connected or attached to the managed computing device 102 does not prevent the BMC 104 from being considered separate from a processing resource (e.g., 106 in the computing device 102) that executes the OS 109. The BMC 104 has management capabilities to manage components of the computing device 102. Examples of management capabilities of the BMC 104 can include any or some combination of the following: power control to perform power management of the computing device 102 (such as to transition the computing device between different power consumption states in response to detected events), thermal monitoring and control of the computing device 102 (such as to monitor temperatures of the computing device and to control thermal management devices of the computing device), fan control of fans in the computing device 102, system health monitoring based on monitoring measurement data of various sensors of the computing device 102, remote access of the computing device 102 (to access the computing device over a network, for example), remote reboot of the computing device 102 (to trigger the computing device to reboot using a remote command), system setup and deployment of the computing device 102, system security to implement security procedures in the computing device 102, and so forth.

In some examples, the BMC 104 can provide so-called "lights-out" functionality for computing devices. The lights out functionality may allow a user, such as a systems administrator, to perform management operations on the computing device 102 even if the OS 109 is not installed or not functional on the computing device 102.

Moreover, in some examples as shown in FIG. 1, the BMC 104 can run on auxiliary power provided by an auxiliary power supply 110 (e.g., a battery); as a result, the computing device 102 does not have to be powered on to allow the BMC 104 to perform the BMC's operations. The services provided by the BMC 104 may be considered "out-of-band" services, since the OS 109 may not be running and in some cases the computing device 102 may be powered off or is not functioning properly (e.g., the computing device 102 has experienced a fault or hardware failure).

The BMC 104 can include a communication interface 112, such as a network interface, and/or a serial interface, that a device of an administrator or other entity (such as the management system 105) can use to remotely communicate with the BMC 104. The communication interface 112 can include a transceiver for transmitting and receiving signals over a communication channel, as well as any protocol layer(s) associated with communication protocol(s) used for the communication of data over the communication channel. An "out-of-band" service can be provided by the BMC 104 via a dedicated management channel (e.g., the communication interface) and is available whether or not the computing device 102 is in a powered on state.

The auxiliary power supply 110 is separate from a main power supply (not shown) that provides power to the computing device 102.

The BMC 104 further includes a processor 114 and a non-volatile memory 116. The non-volatile memory 116 can be implemented using a non-volatile memory device (or multiple non-volatile memory devices), such as a flash memory device or any other type of memory device that maintains data stored in the memory device even if power is removed from the memory device.

The non-volatile memory 116 stores hash value protection instructions 118 that are executable on the processor 114 to provide protection for hash values produced by the computing device 102 and sent to the BMC 104 over the secure connection 108. The hash value protection instructions 118 are executable on the processor 114 to receive a hash value produced by the computing device 102, apply the received hash value and a pepper 120 to a cryptographic hash function to generate a corresponding hash value. The generated pepper 120 is stored in the non-volatile memory 116 (or in another storage medium).

In some examples, the pepper 120 can be generated by the processor 114 using a random number generator 122 associated with the BMC 104. The random number generator 122 can be a hardware random number generator or a random number generator implemented using machine-readable instructions. A "pepper" can refer to a value that is used as an additional input to a function (e.g., a cryptographic hash function) to provide additional protection for another value (e.g., a user credential). Although the use of a pepper is comparable to that of a salt, the pepper is not stored alongside the hashed value, but rather the pepper is stored at a separate location from the hashed value to reduce the likelihood that the pepper can be accessed by an unauthorized entity. In the example of FIG. 1, the pepper 120 is stored in the non-volatile memory 116 that is separate from the computing device 102 that has a hash function 132 to produce a hash value.

The cryptographic hash function in the BMC 104 that is applied on the received hash value and the pepper 120 can be implemented using a hardware hash engine 124. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the cryptographic hash function implemented by the hardware hash engine 124 can include a hash-based message authentication code (HMAC) hash function, also referred to as a Keyed-Hashing for Message Authentication hash function, as described by Request for Comments (RFC) 2104, dated February 1997. In other examples, the cryptographic hash function implemented by the hardware hash engine 124 can be a bcrypt hash function. In further examples, the hash function implemented by the hardware hash engine 124 can be a different type of hash function.

In further examples, instead of implementing the hash function using the hardware hash engine 124, the hash function used by the BMC 104 can be implemented using machine-readable instructions executed by the processor 114.

Figure 2:
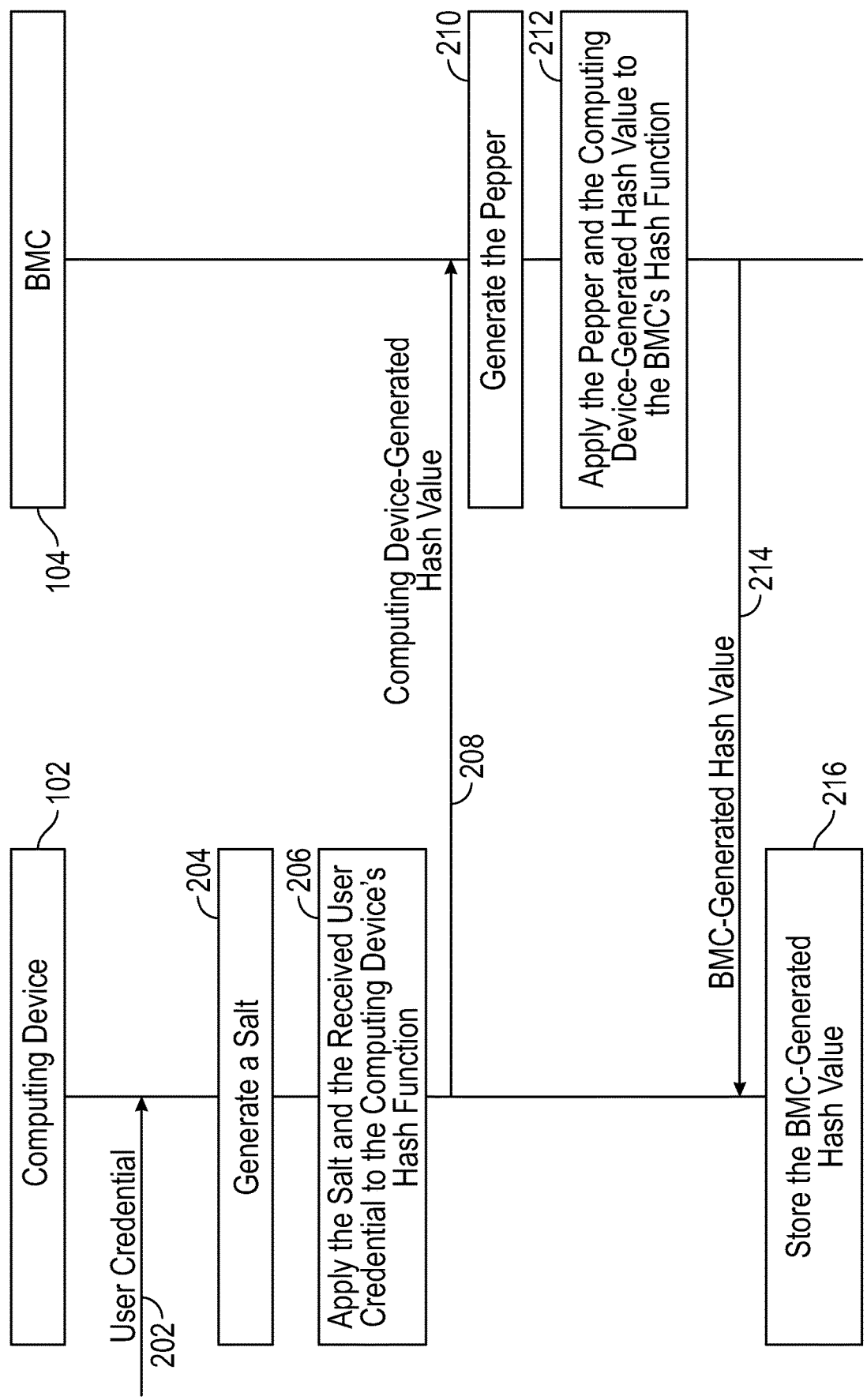
FIG. 2 is a message flow diagram of a process of setting up a user account, according to some examples.

The following refers further to FIG. 2, which is a message flow diagram illustrating tasks performed by the computing device 102 and the BMC 104 as part of setting up an account for a user, in which the user supplies a user credential that is to be used subsequently for access of the computing device 102. Setting up an account for a user can refer to a procedure by which a user can register the user's user credential with the computing device 102 so that the user can access the computing device 102 at a later time.

The computing device 102 (and more specifically, access control instructions 126 of the computing device 102) receives a user credential (at 202) as part of the user account setup. As shown in FIG. 1, the access control instructions 126 are stored in a storage medium 128 in the computing device 102. The access control instructions 126 are executable on the processor 106 to perform corresponding tasks, which can include setting up a user account and controlling whether or not a user is able to access the computing device 102 based on a user credential presented by the user.

In response to receiving the user credential 202 as part of setting up a user account, the access control instructions 126 are executable to generate (at 204) a salt 131. The generated salt 131 can be stored in the storage medium 128. In some examples, the salt 131 is a random number produced using a random number generator 130 of the computing device 102. The random number generator 130 can be a hardware random number generator or a random number generator implemented as machine-readable instructions.

The access control instructions 126 are executable to apply (at 206) the salt 131 and the received user credential to the computing device's hash function 132, to produce a computing device-generated hash value. The computing device's hash function 132 can be implemented as machine-readable instructions. In other examples, the computing device's hash function 132 may be implemented as a hardware hash engine. The computing device's hash function 132 can be a cryptographic hash function, such as an HMAC hash function, a bcrypt hash function, or another type of hash function.

The computing device 102 sends (at 208) the computing device-generated hash value to the BMC 104. The generation of the computing device-generated hash value and the sending of the computing device-generated hash value can be in an OS environment provided by the OS 109 that is running in the computing device 102.

In response to receipt of the computing device-generated hash value, the hash value protection instructions 118 of the BMC 104 are executable to generate (at 210) the pepper 120, such as by use of the random number generator 122.

Next, the hash value protection instructions 118 are executable to apply (at 212) the pepper 120 and the computing device-generated hash value to the BMC's hash function, which can be implemented by the hardware hash engine 124. The hardware hash engine 124 produces a BMC-generated hash value based on the pepper 120 and the computing device-generated hash value.

The BMC 104 sends (at 214) the BMC-generated hash value to the computing device 102. The computing device 102 stores (at 216) the BMC-generated hash value 134 in the storage medium 128 of the computing device 102.

Figure 3:
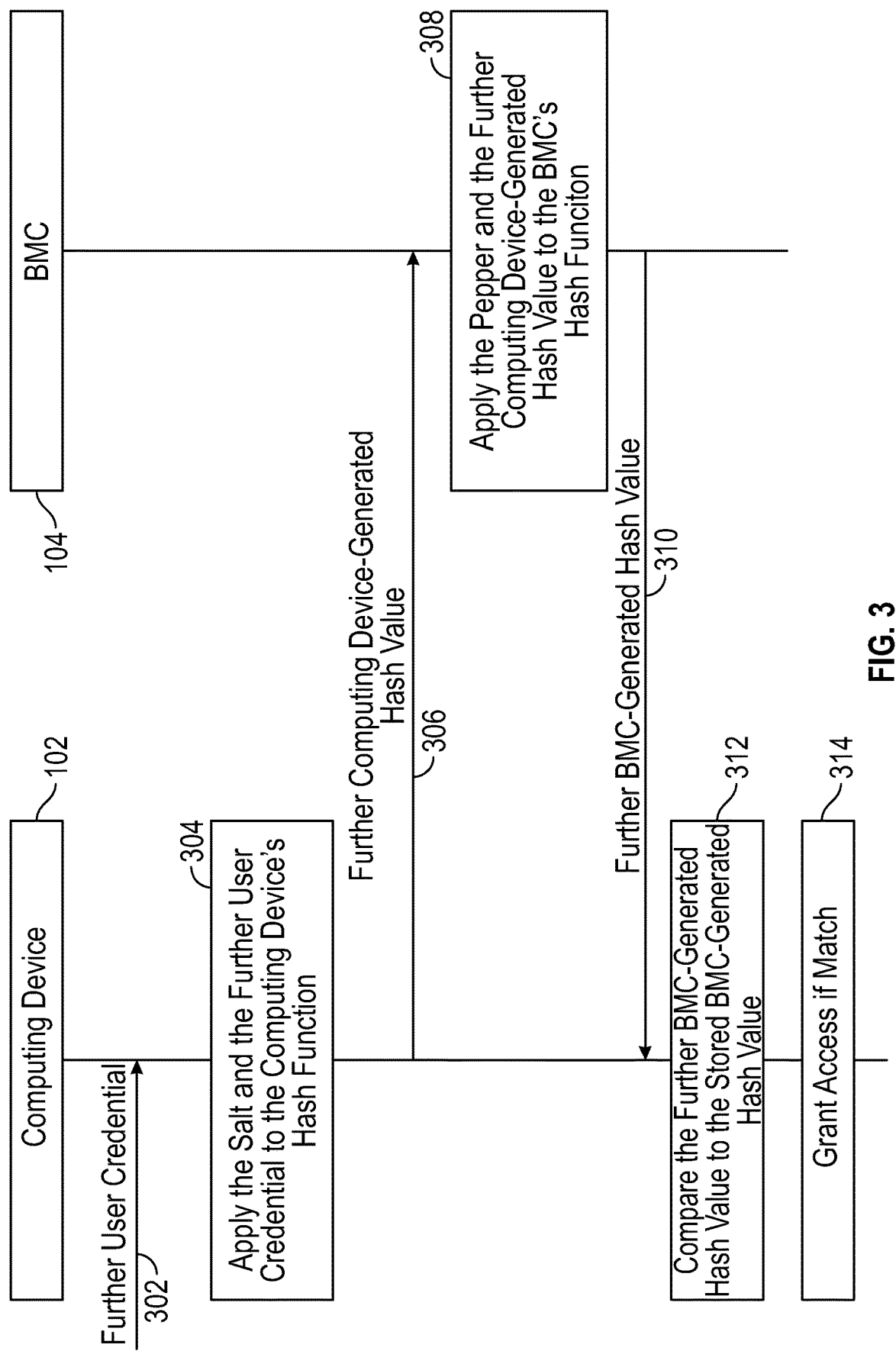
FIG. 3 is a message flow diagram of a process of controlling access to a computing device, according to some examples.

FIG. 3 is a message flow diagram of tasks performed by the computing device 102 and the BMC 104 for determining whether or not a user is permitted to access the computing device 102, in response to receipt (at 302) by the computing device 102 of a further user credential.

The access control instructions 126 of the computing device 102 are executable to apply (at 304) the salt 131 (retrieved from the storage medium 128) and the further user credential to the computing device's hash function 132, which produces a further computing device-generated hash value.

The computing device 102 sends (at 306) the further computing device-generated hash value to the BMC 104. In response to receipt of the further computing device-generated hash value, the hash value protection instructions 118 of the BMC 104 are executable to apply (at 308) the pepper 120 and the further computing device-generated hash value to the BMC's hash function (which is implemented by the hardware hash engine 124) to produce a further BMC-generated hash value.

The BMC 104 sends (at 310) the further BMC-generated hash value to the computing device 102. The access control instructions 126 of the computing device 102 are executable to compare (at 312) the further BMC-generated hash value received from the BMC 104 to the BMC-generated hash value 134 stored by the computing device 102 to determine whether there is a match between the BMC-generated hash values. If there is a match, then the access control instructions 126 are executable to grant (at 314) access of the user to the computing device 102. If there is no match between the further BMC-generated hash value and the stored BMC-generated hash value 134, then the access control instructions 126 are executable to deny access of the computing device 102 to the user.

In some examples, mechanisms are provided to allow a recovery from either a failure or fault of the BMC 104 or the computing device 102. A BMC backup store can store configuration data for configuring the BMC 104 as well as credentials of the BMC 104 that are used to enable access of the BMC 104. A backup operation can be performed to back up the configuration data and other information for the BMC 104 to the BMC backup store. The configuration data for the BMC 104 can be stored in an encrypted file for example, and the encrypted file can further store a copy of the pepper 120 and other information. If the BMC 104 were to experience a failure or fault that prevents the BMC 104 from functioning properly, failure or fault recovery can involve either the BMC 104 or another BMC (e.g., a backup or failover BMC) accessing the BMC backup store to retrieve its credentials as well as the encrypted file to restore configuration data, pepper 120, and other information.

A device backup store can also be maintained for the computing device 102. A backup operation can be performed to back up information (e.g., the salt 131, BMC-generated hash values 134, and other information) stored in the storage medium 128 of the computing device 104 to the device backup store. If the computing device 102 were to experience a failure or fault, then the computing device 102 or a backup or failover computing device can access the device backup store to recover the salt 131, the BMC-generated hash values 134, and other information.

Figure 4:
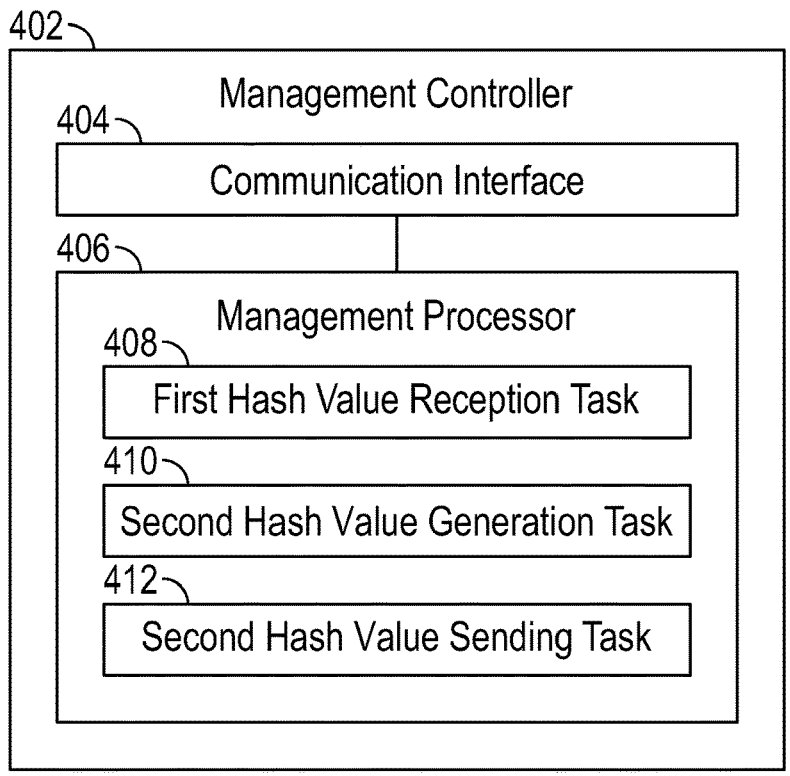
FIG. 4 is a block diagram of a management controller according to some examples.

FIG. 4 is a block diagram of a management controller 402 (e.g., the BMC 104 of FIG. 1) that includes a communication interface 404 to communicate with a computing device (e.g., 102 of FIG. 1). The management controller 402 is separate from a processor (e.g., 106 of FIG. 1) of the computing device.

The management controller 402 includes a management processor 406 (e.g., the processor 114 of the BMC 104 of FIG. 1) to perform various tasks. The tasks of the management processor 406 include a first hash value reception task 408 to receive, from the computing device, a first hash value that is based on a first hash function (e.g., a cryptographic hash function) applied on an input value (e.g., a user credential or another value) and a salt.

The tasks of the management processor 406 further include a second hash value generation task 410 to generate a second hash value (e.g., a cryptographic hash function) based on applying a second hash function on the first hash value and a pepper. The first hash function is part of the computing device, and the second hash function is part of the management controller 402. In some examples, the first hash function and the second hash function are the same hash function. In other examples, the first hash function is different from the second hash function.

The pepper can be generated using a random number generated by a random number generator of the management controller 402. The generated pepper can be stored in a storage separate from a storage of the computing device.

The tasks of the management processor 406 further include a second hash value sending task 412 to send the second hash value to the computing device.

In some examples, the management controller 402 is to perform remote access of the computing device (such as to perform management of the computing device), and trigger remote reboot of the computing device, among other tasks that can be performed by the BMC 104, for example.

Figure 5:
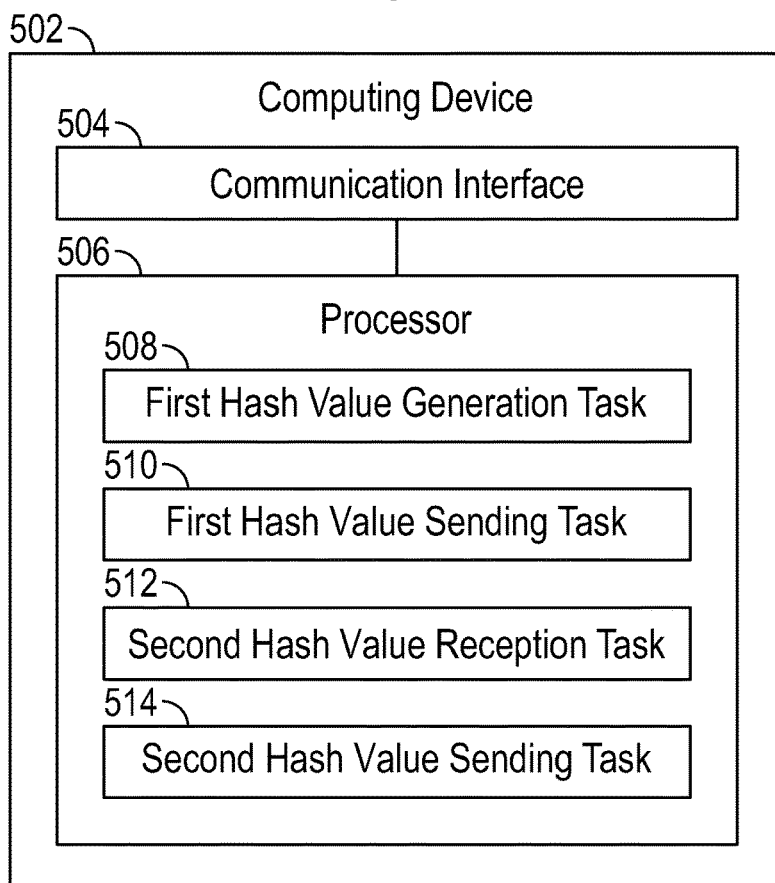
FIG. 5 is a block diagram of a computing device according to some examples.

FIG. 5 is a block diagram of a computing device 502 (e.g., the computing device 102 of FIG. 1). The computing device 502 includes a communication interface 504 to communicate with a management controller (e.g., the BMC 104 of FIG. 1).

The computing device 502 includes a processor 506 separate from the management controller. The processor 506 is to execute machine-readable instructions to execute various tasks of the computing device 502. The tasks of the computing device 502 can include a first hash value generation task 508 to generate a first hash value that is based on a first hash function applied on an input value (e.g., a user credential or another value) and a salt. In some examples, the input value is received as part of establishing a user credential at the computing device 502.

The tasks of the computing device 502 can include a first hash value sending task 510 to send, to the management controller, the first hash value. The generation of the first hash value and the sending of the first hash value can be performed by machine-readable instructions executed in an OS environment when the OS (e.g., 109 of FIG. 1) is running in the computing device 502.

The tasks of the computing device 502 include a second hash value reception task 512 to receive, from the management controller, a second hash value based on applying a second hash function on the first hash value and a pepper.

The tasks of the computing device 502 further include a second hash value using task 514 to use the second hash value in granting access to the computing device.

Figure 6:
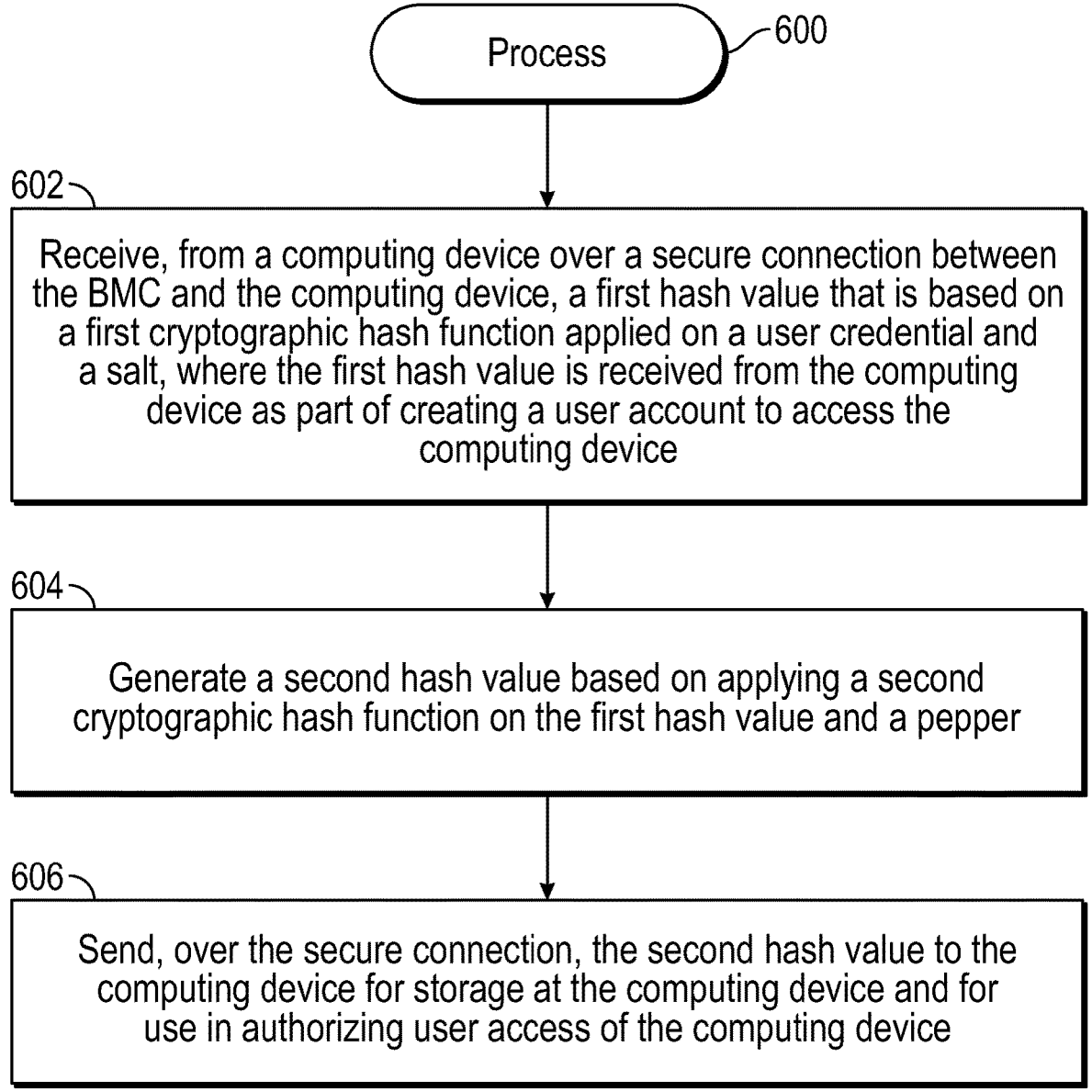
FIG. 6 is a flow diagram of the process according to some examples.

FIG. 6 is a flow diagram of a process 600 that can be performed by a BMC (e.g., 104 in FIG. 1). The process 600 includes receiving (at 602), from a computing device over a secure connection between the BMC and the computing device, a first hash value that is based on a first cryptographic hash function applied on a user credential and a salt, where the first hash value is received from the computing device as part of creating a user account to access the computing device.

The process 600 further includes generating (at 604) a second hash value based on applying a second cryptographic hash function on the first hash value and a pepper.

The process 600 further includes sending (at 606), over the secure connection, the second hash value to the computing device for storage at the computing device and for use in authorizing user access of the computing device.

A storage medium (e.g., 128 or 116 in FIG. 1) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method performed by a system comprising a baseboard management controller (BMC), comprising:
   receiving, from a computing device over a secure connection between the BMC and the computing device, a first hash value that is based on a first cryptographic hash function applied on a user credential and a salt, wherein the first hash value is received from the computing device as part of creating a user account to access the computing device;

generating a second hash value based on applying a second cryptographic hash function on the first hash value and a pepper; and sending, over the secure connection, the second hash value to the computing device for storage at the computing device and for use in authorizing user access of the computing device.

2. The method of claim 1, further comprising:

receiving, by the BMC from the computing device, a third hash value that is based on the first cryptographic hash function applied on a further user credential and the salt, the further user credential provided to access the computing device;

generating, by the BMC, a fourth hash value based on applying the second cryptographic hash function on the third hash value and the pepper; and sending, by the BMC, the fourth hash value to the computing device for comparison of the fourth hash value by the computing device to the second hash value for authorization of user access of the computing device.

3. The method of claim 1, wherein each of the first hash function and the second hash function is a cryptographic hash function.

4. The method of claim 1, wherein the pepper is based on a random number generated from a random number generator.

5. A system comprising:

a baseboard management controller (BMC) that includes a physical processor; and a computing device, wherein the BMC is to:

receive, from the computing device over a secure connection between the BMC and the computing device, a first hash value that is based on a first cryptographic hash function applied on a user credential and a salt, wherein the first hash value is received from the computing device as part of creating a user account to access the computing device;

generate a second hash value based on causing application of a second cryptographic hash function on the first hash value and a pepper; and send, over the secure connection, the second hash value to the computing device for storage by the computing device and for use in authorizing user access of the computing device.

6. The system of claim 5, wherein the BMC is further caused to:

receive, by the BMC from the computing device, a third hash value that is based on the first cryptographic hash function applied on a further user credential and the salt, the further user credential provided to access the computing device;

generate, by the BMC, a fourth hash value based on causing application of the second cryptographic hash function on the third hash value and the pepper; and send, by the BMC, the fourth hash value to the computing device for comparison of the fourth hash value by the computing device to the second hash value for authorization of user access of the computing device.

7. The system of claim 5, wherein each of the first hash function and the second hash function is a cryptographic hash function.

8. The system of claim 5, wherein the pepper is based on a random number generated from a random number generator.

* * * * *